(12) United States Patent
Kojima

(10) Patent No.: US 11,787,043 B2
(45) Date of Patent: Oct. 17, 2023

(54) ROBOT, VEHICLE FOR MOUNTING ROBOT, AND MOBILE ROBOT

(71) Applicant: Seiko Epson Corporation, Toyko (JP)

(72) Inventor: Takashi Kojima, Matsumoto (JP)

(73) Assignee: SEIKO EPSON CORPORATION

( * ) Notice: Subject to any disclaimer, the term of this patent is extended or adjusted under 35 U.S.C. 154(b) by 181 days.

(21) Appl. No.: 17/162,191

(22) Filed: Jan. 29, 2021

(65) Prior Publication Data

US 2021/0237263 A1 Aug. 5, 2021

(30) Foreign Application Priority Data

Jan. 31, 2020 (JP) .................. 2020-015661

(51) Int. Cl.
*B25J 9/12* (2006.01)
*B25J 5/00* (2006.01)
*B60R 16/033* (2006.01)

(52) U.S. Cl.
CPC .................. *B25J 9/12* (2013.01); *B25J 5/007* (2013.01); *B60R 16/033* (2013.01)

(58) Field of Classification Search
CPC ............ B25J 9/12; B25J 5/007; B60R 16/033

USPC .................................................. 307/9.1, 10.1
See application file for complete search history.

(56) References Cited

U.S. PATENT DOCUMENTS

| 9,793,809 B1 * | 10/2017 | Lenz ...................... H02M 3/158 |
| 2011/0199039 A1 * | 8/2011 | Lansberry ............... H02M 1/32 |
| | | 323/284 |
| 2021/0273475 A1 * | 9/2021 | Qiu .......................... H02J 7/00 |

FOREIGN PATENT DOCUMENTS

| JP | 2004-291154 A | 10/2004 |
| JP | 2005-271137 A | 10/2005 |
| JP | 2007-061962 A | 3/2007 |
| JP | 2008-290249 A | 12/2008 |

* cited by examiner

*Primary Examiner* — Michael R. Fin
(74) *Attorney, Agent, or Firm* — Harness, Dickey & Pierce, P.L.C.

(57) ABSTRACT

A mobile robot includes a robot including a robot arm, a motor that drives the robot arm by electric power supplied from a battery, a motor drive circuit that controls driving of the motor, and a voltage conversion unit that converts and outputs a voltage output by the battery to the motor drive circuit, and a vehicle for mounting robot having a movement mechanism and a coupling unit to which the robot is coupled, and moving the robot.

8 Claims, 6 Drawing Sheets

ROBOT, VEHICLE FOR MOUNTING ROBOT, AND MOBILE ROBOT

The present application is based on, and claims priority from JP Application Serial Number 2020-015661, filed Jan. 31, 2020, the disclosure of which is hereby incorporated by reference herein in its entirety.

BACKGROUND

1. Technical Field

The present disclosure relates to a robot, a vehicle for mounting robot, and a mobile robot.

2. Related Art

In related art, walking robots are known. For example, a legged mobile robot shown in JP-A-2005-271137 includes walking means as a movement mechanism. The walking means has a motor. Further, a battery is provided inside of the legged mobile robot and the motor of the walking means and the other respective parts are driven by electric power output by the battery.

However, in the walking robot, the output of the battery is directly applied to the motor. Accordingly, there is a problem that, when the remaining battery is lower, the voltage is lower, driving of the robot becomes unstable, and driving accuracy is lower.

SUMMARY

A robot according to an application example includes a robot arm, a motor that drives the robot arm by electric power supplied from a battery, a motor drive circuit that controls driving of the motor, and a voltage conversion unit that converts and outputs a voltage output by the battery to the motor drive circuit.

A vehicle for mounting robot according to an application example includes a movement mechanism, and a coupling unit to which a robot including a robot arm, a motor that drives the robot arm by electric power supplied from a battery, a motor drive circuit that controls driving of the motor, and a voltage conversion unit that converts and outputs a voltage output by the battery to the motor drive circuit is coupled.

A mobile robot according to an application example includes a robot including a robot arm, a motor that drives the robot arm by electric power supplied from a battery, a motor drive circuit that controls driving of the motor, and a voltage conversion unit that converts and outputs a voltage output by the battery to the motor drive circuit, and a vehicle for mounting robot having a movement mechanism and a coupling unit to which the robot is coupled, and moving the robot.

DESCRIPTION OF EXEMPLARY EMBODIMENTS

As below, a robot, a vehicle for mounting robot, and a mobile robot according to the present disclosure will be explained in detail based on embodiments shown in the accompanying drawings.

First Embodiment

Figure 1:
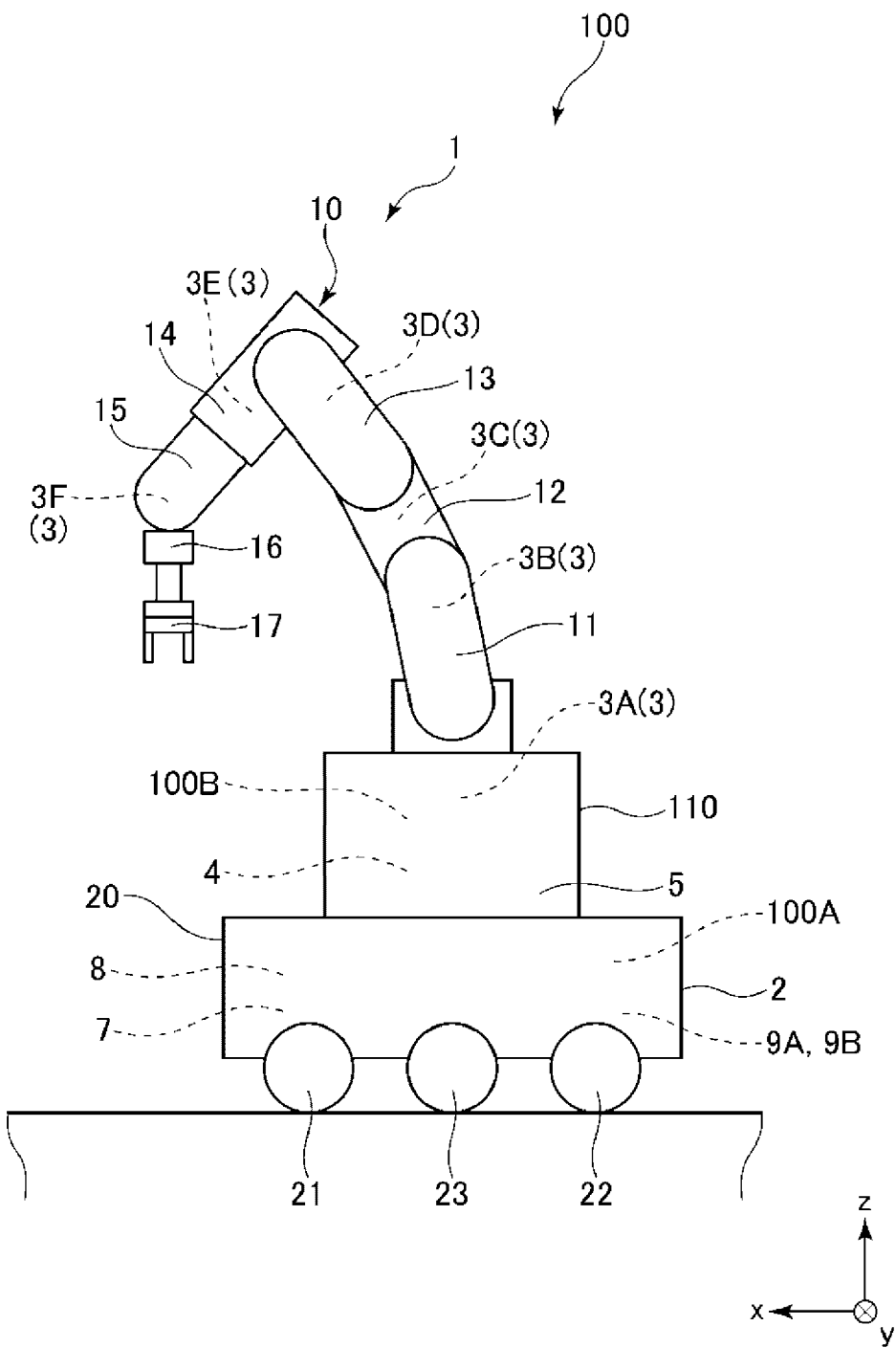
FIG. 1 is a side view showing a mobile robot according to a first embodiment.
Figure 2:
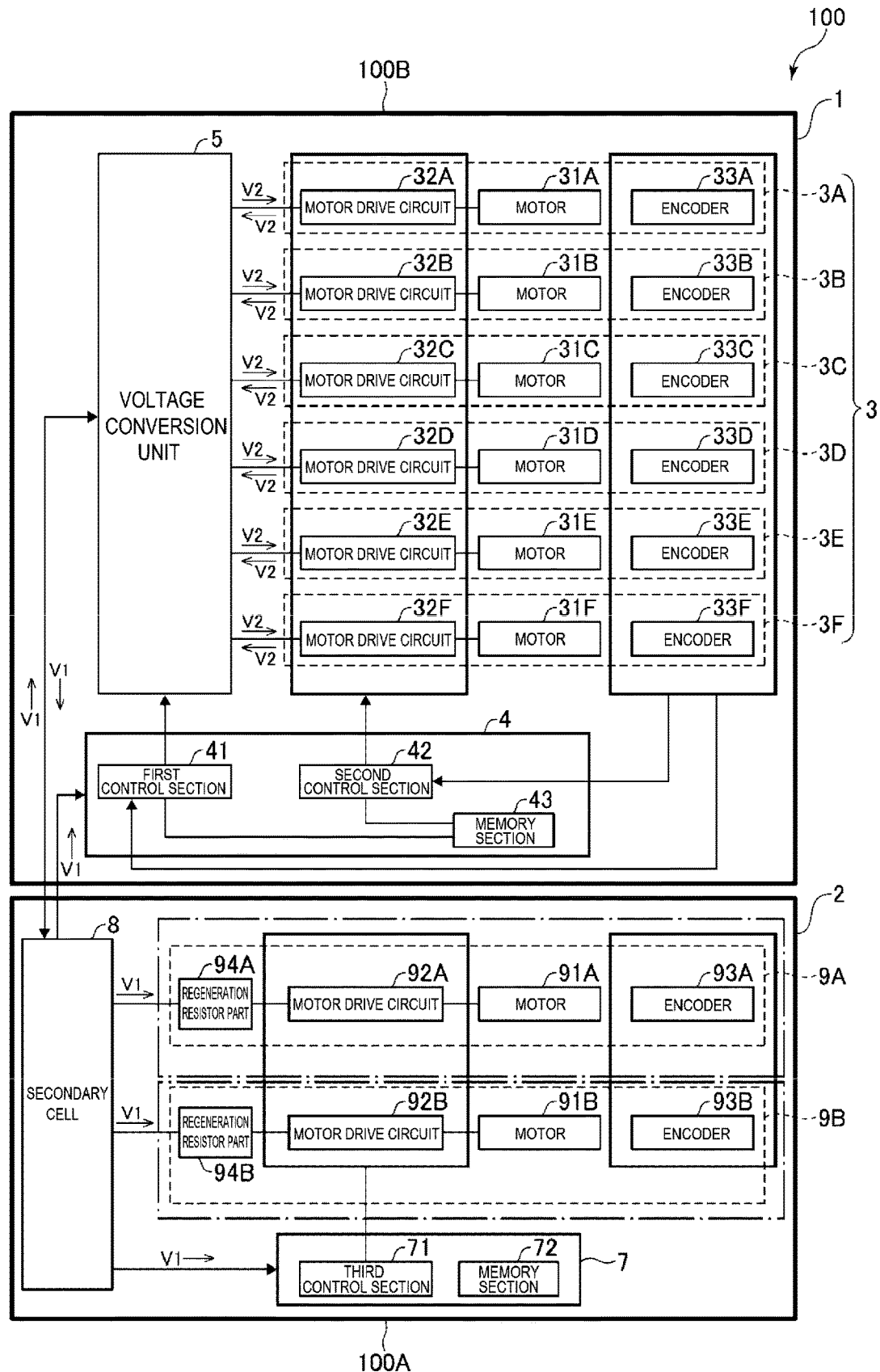
FIG. 2 is a block diagram showing details of the mobile robot shown in FIG. 1.
Figure 3:
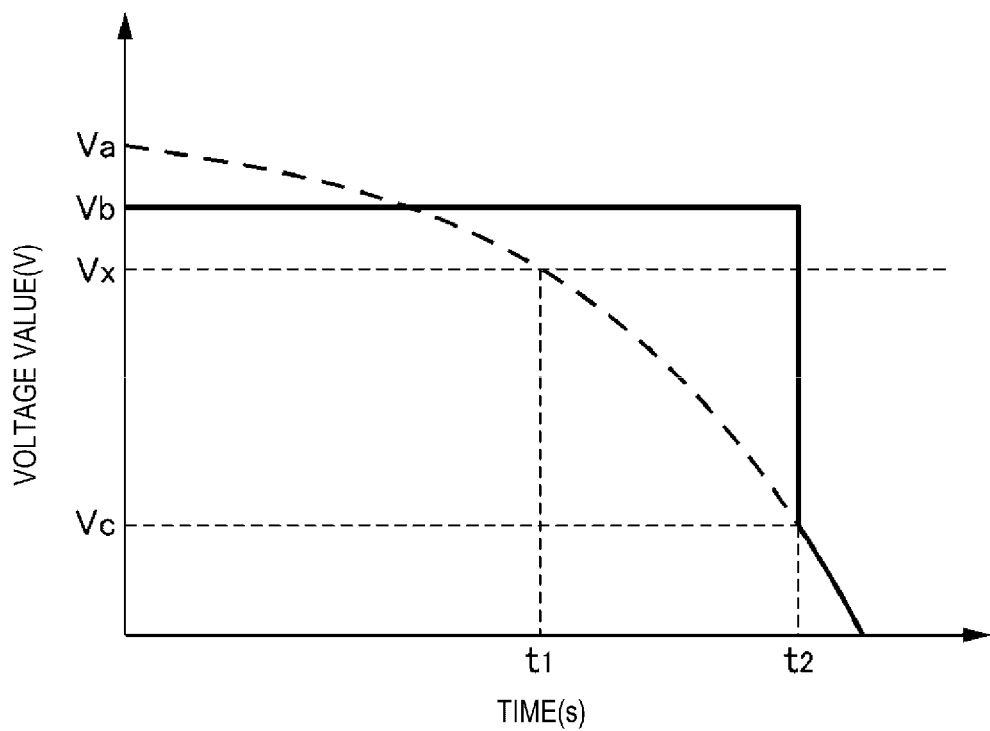
FIG. 3 is a graph showing changes of voltages output by a battery and a voltage conversion unit over time.

FIG. 1 is a side view showing a mobile robot according to a first embodiment. FIG. 2 is a block diagram showing details of the mobile robot shown in FIG. 1. FIG. 3 is a graph showing changes of voltages output by a battery and a voltage conversion unit over time.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions".

Hereinafter, for convenience of explanation, the +z-axis direction in FIG. 1, i.e., the upside is also referred to as "upper" or "above" and the -z-axis direction, i.e., the downside is also referred to as "lower" or "below". Further, the z-axis directions in FIG. 1, i.e., upward and downward directions are referred to as "vertical directions" and the x-axis directions and the y-axis directions, i.e., leftward and rightward directions are referred to as "horizontal directions".

A mobile robot 100 shown in FIG. 1 is an industrial robot used for work of e.g. holding, transport, assembly, inspection, etc. of workpieces including electronic components and electronic apparatuses. The mobile robot 100 includes a robot 1 and a vehicle for mounting robot 2.

The robot 1 shown in FIG. 1 is the so-called six-axis vertical articulated robot and has a base 110, a robot arm 10 coupled to the base 110, drive units 3, a robot control unit 4, and a voltage conversion unit 5.

The base 110 supports the robot arm 10. The base 110 has a housing and, inside of the housing, e.g. a drive device that drives the robot arm 10, a communication unit (not shown) for communication with the robot control unit 4, etc. are provided.

Note that the base 110 is not limited to the shape as shown in the drawing, but may include e.g. a plate-like member and a plurality of legs as long as the base has a function of supporting the robot arm 10.

Or, the base 110 may be omitted or at least partially provided in the vehicle for mounting robot 2.

The robot arm 10 shown in FIG. 1 has a proximal end coupled to the base 110 and includes an arm 11, an arm 12, an arm 13, an arm 14, an arm 15, and an arm 16 as a plurality of arms. These arm 11 to arm 16 are sequentially coupled from the proximal end toward the distal end. The respective arm 11 to arm 16 are pivotable relative to the adjacent arms or the base 110.

Further, as shown in FIGS. 1 and 2, the robot 1 has the drive units 3 as drive units that drive the robot arm. The drive units 3 have a drive unit 3A that pivots the arm 11 relative to the base 110, a drive unit 3B that pivots the arm 12 relative to the arm 11, a drive unit 3C that pivots the arm 13 relative to the arm 12, a drive unit 3D that pivots the arm 14 relative to the arm 13, a drive unit 3E that pivots the arm 15 relative to the arm 14, and a drive unit 3F that pivots the arm 16 relative to the arm 15.

As shown in FIG. 2, the drive unit 3A has a motor 31A as a second motor, a motor drive circuit 32A, an encoder 33A, a reducer (not shown), etc. The drive unit 3B has a motor 31B as the second motor, a motor drive circuit 32B, an encoder 33B, a reducer (not shown), etc. The drive unit 3C has a motor 31C as the second motor, a motor drive circuit 32C, an encoder 33C, a reducer (not shown), etc. The drive unit 3D has a motor 31D as the second motor, a motor drive circuit 32D, an encoder 33D, a reducer (not shown), etc. The drive unit 3E has a motor 31E as the second motor, a motor drive circuit 32E, an encoder 33E, a reducer (not shown), etc. The drive unit 3F has a motor 31F as the second motor, a motor drive circuit 32F, an encoder 33F, a reducer (not shown), etc.

The motor 31A is electrically coupled to a second control section 42, which will be described later, via the motor drive circuit 32A. The motor 31B is electrically coupled to the second control section 42 via the motor drive circuit 32B. The motor 31C is electrically coupled to the second control section 42 via the motor drive circuit 32C. The motor 31D is electrically coupled to the second control section 42 via the motor drive circuit 32D. The motor 31E is electrically coupled to the second control section 42 via the motor drive circuit 32E. The motor 31F is electrically coupled to the second control section 42 via the motor drive circuit 32F.

The second control section 42 respectively independently controls energization conditions of the motor drive circuit 32A to motor drive circuit 32F, and thereby, driving of the motor 31A to motor 31F is controlled.

In the embodiment, the motor 31A to motor 31F are servo motors driven by three-phase alternating currents. Therefore, the motor drive circuit 32A to motor drive circuit 32F perform PWM (Pulse Width Modulation) control to drive the motor 31A to motor 31F.

Note that the motor 31A to motor 31F may have configurations driven by direct currents, not limited to those configurations.

The encoder 33A to encoder 33F are examples as operating state sensors that sense an operating state of the robot arm 10. The encoder 33A to encoder 33F are respectively electrically coupled to the second control section 42, and detected position information, i.e., electrical signals corresponding to sensing results are transmitted to the second control section 42. According to the configuration, the second control section 42 controls driving of the motor 31A to motor 31F based on the sensing results of the encoder 33A to encoder 33F.

Further, as shown in FIG. 1, an end effector 17 that holds a work object is attached to the distal end of the robot arm 10. In the illustrated configuration, the end effector 17 grips the work object by bringing a plurality of e.g. two fingers closer to each other or away from each other. Note that the end effector 17 is not limited to the configuration, but may be a suction hand, magnetic hand, or the like.

When the end effector 17 is driven by a motor, regeneration power thereof may be supplied to a secondary cell 8.

The robot control unit 4 has a first control section 41 that controls actuation of the voltage conversion unit 5, which will be described later, the second control section 42 that controls driving of the motor drive circuit 32A to motor drive circuit 32F, and a memory section 43.

The first control section 41 is a control section having e.g. a CPU (Central Processing Unit) and reading and executing various programs etc. stored in the memory section 43. Switching of the switch within the voltage conversion unit 5 to be described later is controlled by a command signal generated by the first control section 41.

The second control section 42 has e.g. a CPU (Central Processing Unit) and reads and executes various programs etc. stored in the memory section 43. The robot arm 10 may execute a predetermined work by a command signal generated by the second control section 42.

The memory section 43 stores the various programs etc. that can be executed by the first control section 41 and the second control section 42. The memory section 43 includes e.g. a volatile memory such as a RAM (Random Access Memory), a nonvolatile memory such as a ROM (Read Only Memory), and a detachable external memory device. The connection between the memory section 43 and the first control section 41 and second control section 42 may be not only wired connection but also wireless connection, or connection by communication via a network such as the Internet.

Next, the vehicle for mounting robot 2 will be explained.

The vehicle for mounting robot 2 is configured by an autonomous traveling system and moves the robot 1.

The vehicle for mounting robot 2 has a plurality of wheels, i.e., a pair of front wheels 21, a pair of rear wheels 22, and a pair of drive wheels 23, a vehicle main body 20 in which these wheels are placed, a vehicle control unit 7, the secondary cell 8, and drive units 9A, 9B.

The pair of drive wheels 23 are an example of a movement mechanism 20A and provided between the pair of front wheels 21 and the pair of rear wheels 22. One drive wheel 23 is driven by the drive unit 9A and the other drive wheel 23 is driven by the drive unit 9B.

The drive unit 9A has a motor 91A as a first motor, a motor drive circuit 92A, an encoder 93A, a regeneration resistor part 94A, and a reducer (not shown), etc. The drive unit 9B has a motor 91B as the first motor, a motor drive circuit 92B, an encoder 93B, a regeneration resistor part 94B, and a reducer (not shown), etc.

The motor 91A is electrically coupled to a third control section 71, which will be described later, via the motor drive circuit 92A. The motor 91B is electrically coupled to the third control section 71 via the motor drive circuit 92B.

The third control section 71 respectively independently controls energization conditions of the motor drive circuit 92A and the motor drive circuit 92B, and thereby, driving of the motor 91A and the motor 91B is controlled.

The encoder 93A and the encoder 93B are respectively electrically coupled to the third control section 71 and electrical signals corresponding to the detected position information are transmitted to the third control section 71. According to the configuration, the third control section 71 may control the driving of the motor 91A and the motor 91B based on the detection results of the encoder 93A and the encoder 93B.

Regeneration power of the motor 91A is supplied to the regeneration resistor part 94A via the motor drive circuit 92A and regeneration power of the motor 91B is supplied to the regeneration resistor part 94B via the motor drive circuit 92B. The regeneration resistor part 94A and the regeneration resistor part 94B are regeneration power absorbing circuits that absorb the regeneration power, respectively have resistors (not shown), and convert the regeneration power into heat and release the heat.

As described above, the vehicle for mounting robot 2 has the regeneration resistor part 94A and the regeneration resistor part 94B that convert the regeneration power of the motor 91A and the motor 91B as the first motors into heat. Thereby, when the vehicle for mounting robot 2 urgently stops, supply of the excessive regeneration power generated in the motor 91A and the motor 91B to the secondary cell 8 is prevented.

Note that the regeneration resistor part 94A and the regeneration resistor part 94B may be omitted and the regeneration power of the motor 91A and the motor 91B may be stored in the secondary cell 8.

In the embodiment, the pair of front wheels 21 and the pair of rear wheels 22 are driven wheels. However, the present disclosure is not limited thereto, and the pair of front wheels 21 and the pair of rear wheels 22 may be coupled to drive units.

The drive wheels 23 are respectively configured to be forwardly and backwardly rotatable by the drive unit 9A and the drive unit 9B. Accordingly, the traveling direction may be changed by adjustment of at least ones of the rotation speeds and the rotation directions of the respective drive wheels 23. Further, in the embodiment, the front wheels 21, the rear wheels 22, and the drive wheels 23 are configured not to rotate about the z-axis, however, the present disclosure is not limited thereto, and at least ones of the front wheels 21, the rear wheels 22, and the drive wheels 23 may be configured to rotate about the z-axis. In this case, the traveling direction may be changed by adjustment of the amounts of rotation about the z-axis.

Note that "movement" in this specification includes not only "linear movement", "meandering", and "reciprocation" but also "rotation". The number of wheels of the vehicle for mounting robot 2 is not particularly limited. The configuration of the vehicle for mounting robot 2 is not limited to the above described wheeled type, but may be e.g. a configuration with a caterpillar, a configuration walking with a plurality of legs, or the like.

Further, the vehicle for mounting robot 2 has a coupling unit 200 onto which the robot 1 is mounted, i.e., coupled. The coupling unit 200 is provided in an upper part of the vehicle main body 20 and has an attachment and detachment mechanism (not shown) to which the robot 1 is detachably coupled. Thereby, the robot 1 may be mounted on the vehicle for mounting robot 2. The mechanism of the coupling unit 200 is not particularly limited, but may be fixation using screws as long as the robot 1 and the vehicle for mounting robot 2 are fixed.

Note that, in the illustrated configuration, the coupling unit 200 is provided in the upper part of the vehicle main body 20, however, the present disclosure is not limited to that. For example, the coupling unit may be provided in a side part of the vehicle main body.

The vehicle control unit 7 has the third control section 71 that controls the driving of the motor drive circuit 92A and the motor drive circuit 92B and a memory section 72.

The third control section 71 has e.g. a CPU (Central Processing Unit) and reads and executes various programs etc. stored in the memory section 72. The vehicle for mounting robot 2 may travel on a predetermined route by a command signal generated in the third control section 71.

The memory section 72 stores the various programs etc. that can be executed by the third control section 71. The memory section 72 includes e.g. a volatile memory such as a RAM (Random Access Memory), a nonvolatile memory such as a ROM (Read Only Memory), and a detachable external memory device. The connection between the memory section 72 and the third control section 71 may be not only wired connection but also wireless connection, or connection by communication via a network such as the Internet.

As shown in FIG. 2, the secondary cell 8 is a direct-current power supply and outputs a first voltage V1. The secondary cell 8 is provided inside of the vehicle main body 20. The secondary cell 8 can be repeatedly charged and discharged and supplies electric power to the respective parts of the mobile robot 100. That is, the secondary cell 8 is electrically coupled to the motor drive circuit 32A to motor drive circuit 32F and the robot control unit 4 of the robot 1 and the vehicle control unit 7 and the drive unit 9A and the drive unit 9B of the vehicle for mounting robot 2, and supplies electric power to those. Note that the secondary cell is also generally called "storage battery" or "rechargeable battery". The secondary cell refers to a battery that stores electricity by charging for use as a battery and can be repeatedly used.

When the stored electric power is lost, the secondary cell 8 is charged from an external power supply (not shown) for use. The secondary cell 8 is not particularly limited to, but includes e.g. a nickel-cadmium battery, nickel-hydrogen battery, sodium battery, magnesium battery, lithium-ion battery, and lead storage battery as long as the battery can be repeatedly charged and discharged.

Note that, in place of the secondary cell 8, a capacitor such as an electrical double layer capacitor or a primary cell that only discharges may be applied. Hereinafter, the secondary cell, the capacitor, and the primary cell may be collectively referred to as "battery".

Here, circuits of the mobile robot 100 shown in FIG. 2 have a vehicle-side circuit 100A at the vehicle for mounting robot 2 side and a robot-side circuit 100B at the robot 1 side.

The vehicle-side circuit 100A is a circuit that supplies electric power to the motor 91A and the motor 91B as the first motors. That is, the vehicle-side circuit 100A includes electric wiring containing the motor drive circuit 92A between the secondary cell 8 and the motor 91A and electric wiring containing the motor drive circuit 92B between the secondary cell 8 and the motor 91B.

The robot-side circuit 100B is a circuit that supplies the electric power of the secondary cell 8 to the motor 31A to motor 31F as the second motors and supplies the regeneration power of the motor 31A to motor 31F to the secondary cell 8. That is, the robot-side circuit 100B includes electric wiring containing the voltage conversion unit 5 and the motor drive circuit 32A to motor drive circuit 32F between the secondary cell 8 and the motor 31A to motor 31F and the voltage conversion unit 5. The regeneration power of the motor 31A to motor 31F is supplied to the secondary cell 8 respectively via the motor drive circuit 32A to motor drive circuit 32F and the voltage conversion unit 5.

The above described vehicle-side circuit 100A and robot-side circuit 100B are provided, and thereby, the respective parts of the mobile robot 100 are driven by the electric power from the secondary cell 8. In other words, the robot 1 and the vehicle for mounting robot 2 have the secondary cell 8 as the single power supply in common and the respective parts of the robot 1 and the respective parts of the vehicle for mounting robot 2 are driven by the electric power from the secondary cell 8.

Next, the voltage conversion unit 5 will be explained.

The voltage conversion unit 5 converts the first voltage V1 output by the secondary cell 8 and outputs a second voltage V2 to the motor drive circuit 32A to motor drive circuit 32F. In the embodiment, the voltage conversion unit 5 performs both step-up and step-down.

The voltage conversion unit 5 includes e.g. switching DC/DC converter. The DC/DC converter may be of isolated type or non-isolated type, and the isolated type is preferably used. Thereby, the voltage range to be covered may be increased.

A step-up operation and a step-down operation by the voltage conversion unit 5, which will be described later, may be realized by control of a switching circuit (not shown) within the voltage conversion unit 5 by the first control section 41.

Here, when the remaining battery is lower or due to deteriorations over time or the like, the value of the output first voltage V1 changes. Specifically, as shown by a broken line in FIG. 3, the remaining battery is lower over time during driving of the robot arm 10 and the value of the first voltage V1 output by the secondary cell 8 is gradually lower from a voltage Va. That is, the voltage shown by the broken line in FIG. 3 is the voltage output from the secondary cell 8, i.e., the first voltage V1 and the voltage before conversion by the voltage conversion unit 5. The voltage Va is a first voltage output by the secondary cell 8.

Particularly, when time t1 elapses and the voltage value of the first voltage V1 is below a first predetermined value Vx, deterioration of T-N characteristics of the motor 31A to motor 31F is significant and the operation accuracy of the robot arm 10 is significantly lower. Note that the first predetermined value Vx is a lower limit value of the voltage value at which the robot arm 10 may exert good performance and may be appropriately set. Further, the first predetermined value Vx is stored in the memory section 43.

Accordingly, in the present disclosure, the voltage conversion unit 5 converts the first voltage V1 to set the value of the output second voltage V2 to a rated voltage Vb. The rated voltage Vb is set to an arbitrary value at which the motor 31A to motor 31F may be stably driven e.g. a value equal to or larger than the first predetermined value Vx based on the T-N characteristics. In the embodiment, the voltage obtained by conversion of the voltage output from the secondary cell 8 by the voltage conversion unit 5, i.e., the second voltage V2 is shown by a solid line in FIG. 3. In this regard, the voltage conversion unit 5 converts the first voltage V1 into the rated voltage Vb. However, after a lapse of time t2, the voltage output from the secondary cell 8 may be below a lower limit voltage Vc inconvertible into the rated voltage Vb by the voltage conversion unit 5. In this case, the first voltage V1 is not converted by the voltage conversion unit 5 and the motor 31A to motor 31F are not driven.

Therefore, even the configuration driven by the secondary cell 8 may realize stable driving of the robot arm 10. Further, the time when the voltage value supplied to the motor 31A to motor 31F exceeds the first predetermined value Vx becomes longer from the time t1 to the time t2, and thus, the time for stable driving may be made longer.

It is more clearly confirmed that, when the step-up factor of the voltage conversion unit 5 is larger than 1.0 and equal to or smaller than 1.5, appropriate driving and stable driving of the robot arm 10 may be realized. Further, it is more clearly confirmed that, when the step-down factor of the voltage conversion unit 5 is equal to or larger than 0.5 and smaller than 1.0, appropriate driving and stable driving of the robot arm 10 may be realized.

Note that, in the embodiment, the single voltage conversion unit 5 performs step-up and step-down, however, the present disclosure is not limited to that. A dedicated voltage conversion unit 5 for step-up and a dedicated voltage conversion unit 5 for step-down may be provided.

The voltage conversion unit 5 is not limited to the above described configuration, but may perform only step-up or only step-down. For example, when the voltage Va is smaller than the first predetermined value Vx, the voltage conversion unit performs only step-up and the first voltage V1 is stepped-up and converted into the rated voltage Vb.

Further, in the embodiment, the single voltage conversion unit 5 converts the first voltage V1 output by the secondary cell 8 and respectively outputs the voltage to the motor drive circuit 32A to motor drive circuit 32F, however, the present disclosure is not limited to that. The voltage conversion unit 5 may be provided for each of the motor drive circuit 32A to motor drive circuit 32F.

As shown FIG. 1, the robot 1 has the base 110 supporting the robot arm 10, and the voltage conversion unit 5 is placed within the base 110. That is, in the embodiment, the robot control unit 4 and the voltage conversion unit 5 are collectively provided inside of the base 110. Thereby, the configuration of the robot 1 may be simplified.

Note that, not limited to the above described configuration, but the voltage conversion unit 5 may be provided inside of the vehicle for mounting robot 2.

Further, it is preferable that the voltage conversion unit 5 includes a bidirectional DC/DC converter. That is, it is preferable that the voltage conversion unit 5 steps-up or steps-down the regeneration power generated in the motor 31A to motor 31F and outputs the power to the secondary cell 8. The voltage conversion unit 5 converts the regeneration power generated in the motor 31A to motor 31F according to the voltage of the secondary cell 8, and thereby, the regeneration power generated in the motor 31A to motor 31F may be stored in the secondary cell 8. Also, in this case, a mode in which power is stored in the secondary cell 8 and a mode in which the secondary cell 8 outputs a voltage may be switched by control of switching the switch of the voltage conversion unit 5 by the first control section 41.

The above described voltage conversion unit 5 may be also provided in the vehicle-side circuit 100A.

In the embodiment, the robot 1 is the six-axis vertical articulated robot, however, not limited to that. For example, the robot 1 may be a horizontal articulated robot, the so-called scalar robot and have two or more robot arms 10. Or, the vehicle for mounting robot 2 may have two or more robots 1.

Further, in the embodiment, the secondary cell 8 is provided inside of the vehicle main body 20, however, not limited to that. For example, the secondary cell 8 may be provided inside of the robot 1 or the secondary cell 8 may be coupled from outside of the robot 1 and the vehicle for mounting robot 2.

As described above, the robot 1 includes the robot arm 10, the motor 31A to motor 31F that drive the robot arm 10 by the electric power supplied from the secondary cell 8 as the battery, the motor drive circuit 32A to motor drive circuit 32F that control driving of the motor 31A to motor 31F, and the voltage conversion unit 5 that converts and outputs the voltage output by the secondary cell 8 to the motor drive circuit 32A to motor drive circuit 32F. As described above, the voltage conversion unit 5 is provided, and thereby, for example, even when the remaining battery of the secondary cell 8 is lower and the value of the first voltage V1 is lower, the necessary and sufficient voltage, i.e., the rated voltage Vb may be supplied to the motor 31A to motor 31F.

Therefore, even the configuration driven by the secondary cell 8 may realize appropriate driving and stable driving of the robot arm 10.

Further, the voltage conversion unit 5 steps-up or steps-down the voltage output by the secondary cell 8 as the battery, and thereby, outputs the voltage having the predetermined value, i.e., the rated voltage Vb. Therefore, the rated voltage Vb may be supplied to the motor 31A to motor 31F regardless of the magnitude of the voltage output by the secondary cell 8.

The vehicle for mounting robot 2 includes the movement mechanism 20A and the coupling unit 200 to which the robot 1 having the robot arm 10, the motor 31A to motor 31F that drive the robot arm 10 by the electric power supplied from the secondary cell 8 as the battery, the motor drive circuit 32A to motor drive circuit 32F that control driving of the motor 31A to motor 31F, and the voltage conversion unit 5 that converts and outputs the voltage output by the secondary cell 8 to the motor drive circuit 32A to motor drive circuit 32F is coupled. Thereby, the vehicle for mounting robot 2 that may move the robot 1, which may exert the above described effects of the present disclosure, may be obtained.

The mobile robot 100 includes the robot 1 having the robot arm 10, the motor 31A to motor 31F that drive the robot arm 10 by the electric power supplied from the secondary cell 8 as the battery, the motor drive circuit 32A to motor drive circuit 32F that control driving of the motor 31A to motor 31F, and the voltage conversion unit 5 that converts and outputs the voltage output by the secondary cell 8 to the motor drive circuit 32A to motor drive circuit 32F, and the vehicle for mounting robot 2 having the movement mechanism 20A and the coupling unit 200 to which the robot 1 is coupled, and moving the robot 1. Thereby, the movable mobile robot 100 that exerts the above described effects of the present disclosure may be obtained.

Second Embodiment

Figure 4:
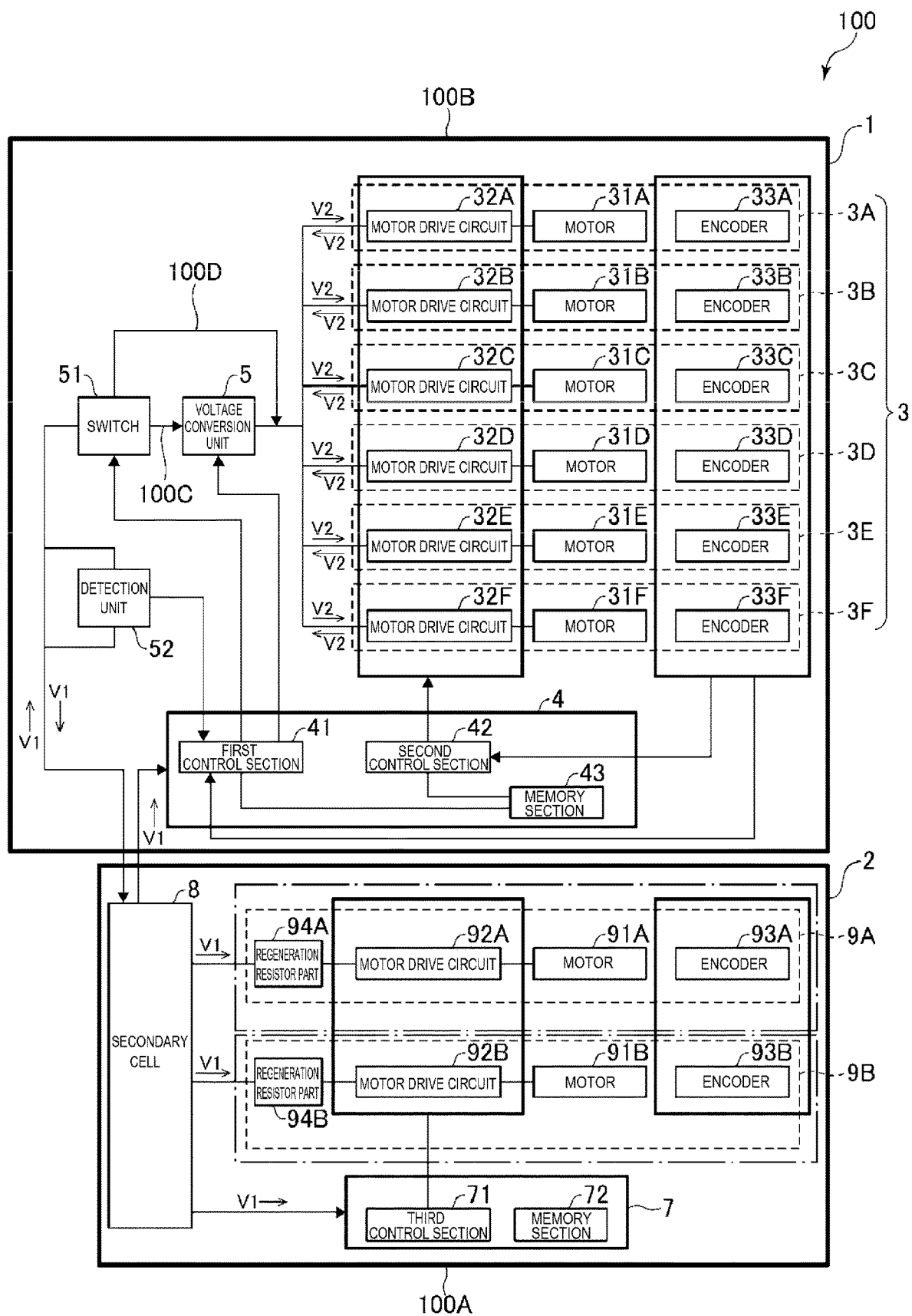
FIG. 4 is a block diagram showing details of a mobile robot according to a second embodiment.
Figure 5:
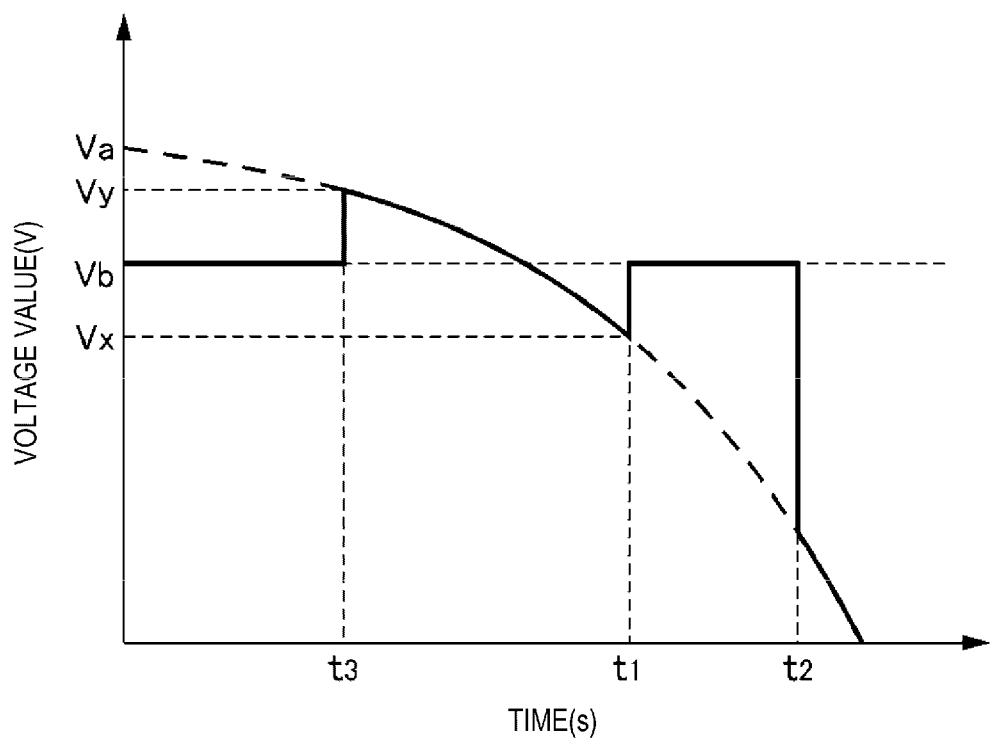
FIG. 5 is a graph showing changes of voltages output by the battery and the voltage conversion unit over time.
Figure 6:
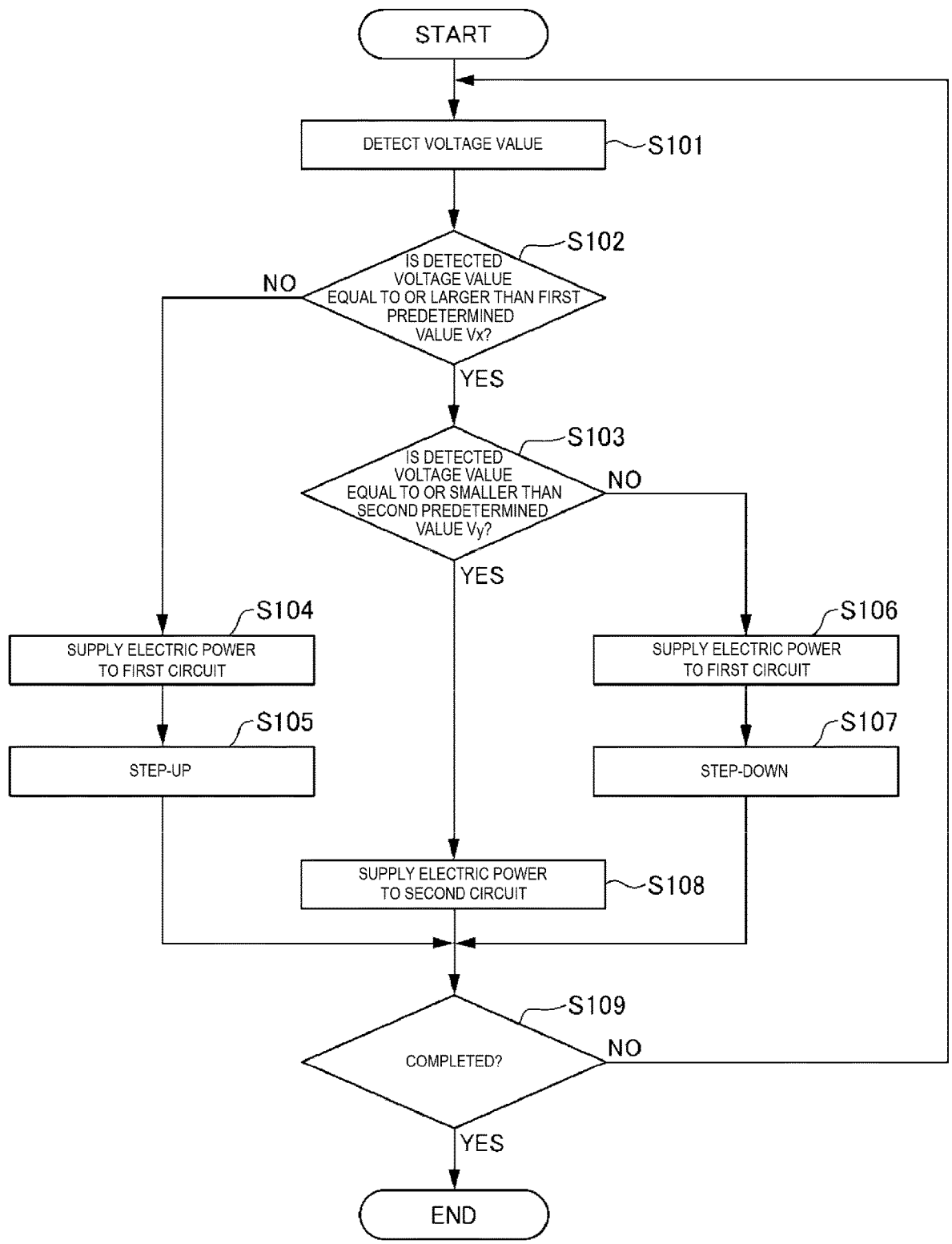
FIG. 6 is a flowchart for explanation of a control operation of a first control section shown in FIG. 4.

FIG. 4 is a block diagram showing details of a mobile robot according to a second embodiment. FIG. 5 is a graph showing changes of voltages output by the battery and the voltage conversion unit over time. FIG. 6 is a flowchart for explanation of a control operation of the first control section shown in FIG. 4.

As below, the second embodiment of the robot, the vehicle for mounting robot, and the mobile robot according to the present disclosure will be explained with reference to these drawings, and the explanation will be made with a focus on differences from the above described first embodiment and the explanation of the same items will be omitted.

As shown in FIG. 4, the robot-side circuit 100B further includes a switch 51 and a detection unit 52.

The switch 51 is provided between the secondary cell 8 and the voltage conversion unit 5. The switch 51 includes a semiconductor switch and a switching operation is performed by a switching signal generated by the first control section 41, which will be described later. Further, the switch 51 has a function of switching supply of the first voltage V1 output by the secondary cell 8 to the voltage conversion unit 5 or supply of the voltage to the motor drive circuit 32A to motor drive circuit 32F not via the voltage conversion unit 5. That is, the switch 51 switches the supply of the first voltage V1 output by the secondary cell 8 to electrical wiring 100C and supply of the voltage to electrical wiring 100D. Note that the switch 51 may include a mechanical switch.

The electrical wiring 100C is wiring coupling the switch 51 and the voltage conversion unit 5. The electrical wiring 100D is wiring coupling the switch 51 and the motor drive circuit 32A to motor drive circuit 32F. Hereinafter, the electrical wiring 100C may be also referred to as "first circuit" and the electrical wiring 100D may be also referred to as "second circuit".

As described above, the robot 1 includes the switch 51 that switches the state in which the electric power output by the secondary cell 8 as the battery is supplied to the voltage conversion unit 5 and the state in which the electric power is supplied to the motor 31A to motor 31F not via the voltage conversion unit 5. Thereby, as will be described later, the configuration in which the voltage conversion unit 5 is not operated when not necessary may be obtained. Therefore, power consumption for actuation of the voltage conversion unit 5 may be suppressed.

Here, FIG. 5 shows the changes of the voltages output by the secondary cell 8 and the voltage conversion unit 5 over time. When the remaining battery is lower or due to deteriorations over time or the like, the value of the first voltage V1 output by the secondary cell 8 changes. Specifically, as shown by a broken line in FIG. 5, the remaining battery is lower over time during driving of the robot arm 10 and the value of the first voltage V1 output by the secondary cell 8 is gradually lower from the voltage Va.

The rated voltage Vb may be set to an arbitrary value that may stably drive the motor 31A to motor 31F e.g. an arbitrary value within a range equal to or larger than the first predetermined value Vx and equal to or smaller than a second predetermined value Vy based on the T-N characteristics. When the voltage Va is larger than the first predetermined value Vx and the second predetermined value Vy, the voltage output from the battery is stepped down and stepped up. As shown by a solid line in FIG. 5, the voltage conversion unit 5 performs step-down until time t3. After the time t3 until the time t1, neither step-down nor step-up is performed. Step-up is performed after the time t1 to the time t2. According to the configuration, for example, even when the remaining battery of the secondary cell 8 is lower and the value of the first voltage V1 is lower, the rated voltage Vb may be supplied to the motor 31A to motor 31F. Therefore, even by the configuration driven by the secondary cell 8 may realize stable driving of the robot arm 10. Further, the time when the voltage value supplied to the motor 31A to motor 31F exceeds the first predetermined value Vx becomes longer from the time t1 to the time t2, and thus, the time for stable driving may be made longer. The voltage value of the first voltage V1 is detected by the detection unit 52, which will be described later.

Note that the second predetermined value Vy is an upper limit value of the voltage value that does not apply excessive load on the motor 31A to motor 31F and may be appropriately set. Further, the second predetermined value Vy is stored in the memory section 43.

The detection unit 52 is provided between the secondary cell 8 and the voltage conversion unit 5 and has a function of detecting the voltage value of the first voltage V1 output by the secondary cell 8. The detection unit 52 is electrically coupled to the first control section 41. Information on the voltage value detected by the detection unit 52 is transmitted to the first control section 41 as an electrical signal.

The first control section 41 compares the information transmitted from the detection unit 52, i.e., a detection result of the detection unit 52 with the first predetermined value Vx and the second predetermined value Vy. Then, the first control section 41 generates a switching signal for the switch 51 according to the comparison result.

Specifically, the first control section 41 controls actuation of the switch 51 to supply electric power to the electrical wiring 100C as the first circuit when the voltage value of the first voltage V1 is below the first predetermined value Vx and when the voltage value of the first voltage V1 is above the second predetermined value Vy. That is, the section controls the actuation of the switch 51 to supply electric power to the voltage conversion unit 5. Thereby, the rated voltage Vb is supplied to the motor drive circuit 32A to motor drive circuit 32F.

As described above, when the detection result detected by the detection unit 52 is below the first predetermined value Vx, the first control section 41 as a control unit controls the actuation of the switch 51 to supply electric power to the voltage conversion unit 5. Thereby, even when the voltage value output by the secondary cell 8 is below the first predetermined value Vx, the voltage conversion unit 5 may output the rated voltage Vb. Therefore, the robot arm 10 may be stably driven.

Further, when the detection result detected by the detection unit 52 is above the second predetermined value Vy, the first control section 41 as the control unit controls the actuation of the switch 51 to supply electric power to the voltage conversion unit 5. Thereby, even when the voltage value output by the secondary cell 8 is above the second predetermined value Vy, application of an excessive voltage to the motor drive circuit 32A to motor drive circuit 32F may be prevented or suppressed.

On the other hand, when the voltage value of the first voltage V1 is equal to or larger than the first predetermined value Vx and equal to or smaller than the second predetermined value Vy, i.e., when the voltage value is a proper voltage value, the first control section 41 controls the actuation of the switch 51 to supply electric power to the electrical wiring 100D as the second circuit. That is, the electric power is supplied to the motor drive circuit 32A to motor drive circuit 32F without conversion in the voltage conversion unit 5.

As described above, when the detection result detected by the detection unit 52 is equal to or larger than the first predetermined value Vx and equal to or smaller than the second predetermined value Vy, the first control section 41 as the control unit controls the actuation of the switch 51 to supply electric power to the motor drive circuit 32A to motor drive circuit 32F not via the voltage conversion unit 5. Thereby, the configuration in which the voltage conversion unit 5 is not operated when not necessary, i.e., when the voltage value of the first voltage V1 is proper may be obtained. Therefore, power consumption for actuation of the voltage conversion unit 5 may be suppressed.

As described above, the robot 1 includes the detection unit 52 that detects the first voltage V1 output by the secondary cell 8 as the battery and the first control section 41 as the control unit that controls the actuation of the switch 51 based on the detection result of the detection unit 52. Thereby, as described above, whether or not the first voltage V1 is converted by the voltage conversion unit 5 may be selected according to the detection result of the detection unit 52.

Next, the control operation of the robot control unit 4 will be explained according to the flowchart shown in FIG. 6.

First, at step S101, the voltage value of the first voltage V1 output by the secondary cell 8 is detected. Then, at step S102, whether or not the voltage value of the first voltage V1 is equal to or larger than the first predetermined value Vx is determined. At step S102, a determination that the voltage value of the first voltage V1 is equal to or larger than the first predetermined value Vx is made, the process moves to step S103.

On the other hand, at step S102, a determination that the voltage value of the first voltage V1 is not equal to or larger than the first predetermined value Vx is made, at step S104, electric power is supplied to the voltage conversion unit 5, that is, the switch 51 is switched so that electric power may be supplied to the electrical wiring 100C. Then, at step S105, step-up is performed. Thereby, even when the voltage value of the first voltage V1 is below the first predetermined value Vx, the rated voltage Vb may be supplied to the motor drive circuit 32A to motor drive circuit 32F. Therefore, stable driving of the robot arm 10 may be realized.

At step S103, whether or not the voltage value of the first voltage V1 is equal to or smaller than the second predetermined value Vy is determined. At step S103, a determination that the voltage value of the first voltage V1 is equal to or smaller than the second predetermined value Vy is made, at step S108, electric power is directly supplied to the motor drive circuit 32A to motor drive circuit 32F. That is, the switch 51 is switched so that electric power may be supplied to the electrical wiring 100D. Thereby, the configuration in which the voltage conversion unit 5 is not operated when the voltage value of the first voltage V1 is proper may be obtained. Therefore, the power consumption for actuation of the voltage conversion unit 5 may be suppressed.

On the other hand, at step S103, a determination that the voltage value of the first voltage V1 is above the second predetermined value Vy is made, at step S106, electric power is supplied to the voltage conversion unit 5, that is, the switch 51 is switched so that electric power may be supplied to the electrical wiring 100C. Then, at step S107, step-down is performed. Thereby, even when the voltage value of the first voltage V1 is above the second predetermined value Vy, the rated voltage Vb may be supplied to the motor drive circuit 32A to motor drive circuit 32F. Therefore, application of an excessive voltage to the motor drive circuit 32A to motor drive circuit 32F may be prevented or suppressed.

Then, at step S109, whether or not an operation program of the robot 1 is completed is determined. The determination is performed according to an end instruction from an operator or whether or not the entire of the designated operation program ends. At step S109, a determination that the operation program is not completed is made, the process returns to step S101 and the subsequent steps are sequentially repeated.

As above, the robot, the vehicle for mounting robot, and the mobile robot according to the present disclosure are explained based on the illustrated embodiments, however, the present disclosure is not limited to those. The configurations of the respective parts may be replaced by arbitrary configurations having the same functions. Further, another arbitrary configuration may be added to the present disclosure. Furthermore, the robots according to the above described embodiments are of the systems including the six-axis vertical articulated robots, however, the numbers of axes of the vertical articulated robots may be five or less, seven, or more. Or, horizontal articulated robots may be used in place of the vertical articulated robots.

What is claimed is:
1. A mobile robot comprising:
  a robot including:
    a robot arm;
    a motor configured to drive the robot arm by electric power supplied from a battery;

a motor drive circuit configured to control driving of the motor by receiving the electric power from the battery;

a voltage converter configured to receive a first voltage output by the battery and convert the first voltage to a second voltage, the second voltage being supplied to the motor drive circuit, the second voltage being higher than the first voltage; and a voltage detector configured to detect a value of the first voltage from the battery and determine whether the value of the first voltage is lower than a first predetermined value;

a vehicle for mounting and moving the robot, the vehicle having a movement mechanism and a coupler to which the robot is coupled; and a processor configured to execute a program stored in a memory so as to:

transfer the first voltage to the voltage converter when the voltage detector determines that the value of the first voltage is lower than the first predetermined value;

control the motor drive circuit of the robot by supplying the second voltage as the electric power when the voltage detector determines that the value of the first voltage is lower than the first predetermined value;

transfer the first voltage directly to the motor drive circuit when the voltage detector determines that the value of the first voltage is equal to or more than the first predetermined value; and control the motor drive circuit of the robot by supplying the first voltage as the electric power when the voltage detector determines that the value of the first voltage is equal to or more than the first predetermined value, wherein the voltage detector is configured to determine whether the value of the first voltage is higher than a second predetermined value, and the second predetermined value is larger than the first predetermined value, and the processor is configured to transfer the first voltage directly to the motor drive circuit when the voltage detector determines that the value of the first voltage is equal to or more than the first predetermined value and is equal to or lower than the second predetermined value.

2. The mobile robot according to claim 1, wherein the voltage converter is configured to perform step-up or step-down of the first voltage output by the battery.

3. The mobile robot according to claim 1, further comprising a switch, wherein the processor is configured to:

control actuation of the switch to transfer the first voltage to the voltage converter when the voltage detector determines that the value of the first voltage is lower than the first predetermined value; and control the actuation of the switch to transfer the first voltage directly to the motor drive circuit when the voltage detector determines that the value of the first voltage is equal to or more than the first predetermined value.

4. The mobile robot according to claim 1, wherein the processor is configured to transfer the first voltage to the voltage converter when the voltage detector determines that the value of the first voltage is higher than the second predetermined value, the voltage converter is configured to convert the first voltage to a third voltage when the voltage detector determines that the value of the first voltage is higher than the second predetermined value, and the third voltage is supplied to the motor drive circuit as the electric power, and the third voltage is lower than the first voltage which is higher than the second predetermined value.

5. A vehicle for mounting a robot, the robot including:

a robot arm;

a motor configured to drive the robot arm by electric power supplied from a battery;

a motor drive circuit configured to control driving of the motor by receiving the electric power from the battery;

a voltage converter configured to receive a first voltage output by the battery and convert the first voltage to a second voltage, the second voltage being supplied to the motor drive circuit, the second voltage being higher than the first voltage;

a voltage detector configured to detect a value of the first voltage from the battery and determine whether the value of the first voltage is lower than a first predetermined value; and a processor configured to execute a program stored in a memory so as to:

transfer the first voltage to the voltage converter when the voltage detector determines that the value of the first voltage is lower than the first predetermined value;

control the motor drive circuit of the robot by supplying the second voltage as the electric power when the voltage detector determines that the value of the first voltage is lower than the first predetermined value;

transfer the first voltage directly to the motor drive circuit when the voltage detector determines that the value of the first voltage is equal to or more than the first predetermined value; and control the motor drive circuit of the robot by supplying the first voltage as the electric power when the voltage detector determines that the value of the first voltage is equal to or more than the first predetermined value, the vehicle comprising:

the battery;

a movement mechanism; and a coupler to which the robot is coupled, wherein the voltage detector is configured to determine whether the value of the first voltage is higher than a second predetermined value, and the second predetermined value is larger than the first predetermined value, and the processor is configured to transfer the first voltage directly to the motor drive circuit when the voltage detector determines that the value of the first voltage is equal to or more than the first predetermined value and is equal to or lower than the second predetermined value.

6. A robot comprising:

a robot arm;

a motor configured to drive the robot arm by electric power supplied from a battery;

a motor drive circuit configured to control driving of the motor by receiving the electric power from the battery;

a voltage converter configured to receive a first voltage output by the battery and convert the first voltage to a second voltage, the second voltage being supplied to the motor drive circuit, the second voltage being higher than the first voltage;

a voltage detector configured to detect a value of the first voltage from the battery and determine whether the value of the first voltage is lower than a first predetermined value; and a processor configured to execute a program stored in a memory so as to:

transfer the first voltage to the voltage converter when the voltage detector determines that the value of the first voltage is lower than the first predetermined value;

control the motor drive circuit of the robot by supplying the second voltage as the electric power when the voltage detector determines that the value of the first voltage is lower than the first predetermined value;

transfer the first voltage directly to the motor drive circuit when the voltage detector determines that the value of the first voltage is equal to or more than the first predetermined value; and control the motor drive circuit of the robot by supplying the first voltage as the electric power when the voltage detector determines that the value of the first voltage is equal to or more than the first predetermined value, wherein the voltage detector is configured to determine whether the value of the first voltage is higher than a second predetermined value, and the second predetermined value is larger than the first predetermined value, and the processor is configured to transfer the first voltage directly to the motor drive circuit when the voltage detector determines that the value of the first voltage is equal to or more than the first predetermined value and is equal to or lower than the second predetermined value.

7. The vehicle for mounting the robot according to claim 5, wherein the processor is configured to transfer the first voltage to the voltage converter when the voltage detector determines that the value of the first voltage is higher than the second predetermined value, the voltage converter is configured to convert the first voltage to a third voltage when the voltage detector determines that the value of the first voltage is higher than the second predetermined value, and the third voltage is supplied to the motor drive circuit as the electric power, and the third voltage is lower than the first voltage which is higher than the second predetermined value.

8. The robot according to claim 6, wherein the processor is configured to transfer the first voltage to the voltage converter when the voltage detector determines that the value of the first voltage is higher than the second predetermined value, the voltage converter is configured to convert the first voltage to a third voltage when the voltage detector determines that the value of the first voltage is higher than the second predetermined value, and the third voltage is supplied to the motor drive circuit as the electric power, and the third voltage is lower than the first voltage which is higher than the second predetermined value.

\* \* \* \* \*